United States Patent
Lee et al.

(10) Patent No.: US 7,095,572 B2
(45) Date of Patent: Aug. 22, 2006

(54) LENS HOLDER APPARATUS OF CAMERA LENS MODULE

(75) Inventors: Hyun-Ju Lee, Gyeongsangbuk-do (KR); Yeong-Seop Lee, Gumi-si (KR); Do-Hyung Lee, Daegu (KR); Sang-Ho Kim, Gumi-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 10/926,479

(22) Filed: Aug. 26, 2004

(65) Prior Publication Data

US 2005/0141106 A1    Jun. 30, 2005

(30) Foreign Application Priority Data

Dec. 31, 2003 (KR) .................. 10-2003-0101717

(51) Int. Cl.
*G02B 7/02* (2006.01)

(52) U.S. Cl. .................. 359/808; 359/810; 359/811; 359/819

(58) Field of Classification Search .............. 359/808, 359/809, 810, 811, 813, 819, 821, 822, 823, 359/827, 830

See application file for complete search history.

(56) References Cited

U.S. PATENT DOCUMENTS

| | | | | |
|---|---|---|---|---|
| 5,400,072 A | * | 3/1995 | Izumi et al. ................. | 348/335 |
| 5,533,159 A | * | 7/1996 | Okochi et al. ................ | 385/93 |
| 6,876,544 B1 | * | 4/2005 | Hsin .......................... | 361/679 |
| 2002/0131782 A1 | * | 9/2002 | Yamaguchi et al. ........ | 396/429 |
| 2004/0150740 A1 | * | 8/2004 | Hsin .......................... | 348/340 |

* cited by examiner

*Primary Examiner*—Scott J. Sugarman
*Assistant Examiner*—Brandi Thomas
(74) *Attorney, Agent, or Firm*—Cha & Reiter, L.L.C.

(57) ABSTRACT

A lens holder apparatus of a camera lens module is provided and includes a printed circuit board, an image sensor provided on a printed circuit board, a plurality of lenses, and a spacer The lenses are assembled within the lens holder allow focal lengths between the sensor and respective lenses to be adjusted freely, and a stopper is detachably provided at a lower portion of the space of the lens holder, such that the stopper can be separated from the lower portion and then recombined therewith after the readjustment of the focal length.

15 Claims, 5 Drawing Sheets

LENS HOLDER APPARATUS OF CAMERA LENS MODULE

CLAIM OF PRIORITY

This application claims priority to an application entitled "LENS HOLDER APPARATUS FOR CAMERA LENS MODULE," filed in the Korean Intellectual Property Office on Dec. 31, 2003 and assigned Ser. No. 2003-101717, the contents of which are hereby incorporated by reference.

BACKGROUND OF THE INVENTION

1. Field of the Invention

The present invention relates to a lens holder apparatus used in a camera lens module, and more particularly to a camera lens module integrated to a lens holder capable of readjusting a focal length after combining respective lenses in the camera lens module.

2. Description of the Related Art

In general, an imaging device, such as a CCD (charge coupled device), is typically used for capturing an image in a video camera, an electronic steel camera, a PC camera terminal, PDA (Personal Digital Assistant) or the like. This is also referred to as "camera lens module." In a conventional PDA for used in video communications, a photographing device containing the camera lens module is provided in a camera lens to enable a user to conduct video communications with others or photographs of a desired object. As such, the conventional PDA has been developed into a high performance, complex piece of machinery equipped with a camera, which can take a temporary image of the object and also store and transmit the image to another place. Such a camera lens module is configured so that an image of the object taken by the CCD through a lens and a diaphragm can be stored in a memory after the transformation into a digital signal using a signal transformer.

A CMOS image sensor is commonly used an image sensor. The CMOS image sensor is a device employing a switching system for sequentially detecting outputs using MOS transistors, which equals to the number of pixels. This type of CMOS technology adopts a control circuit and a signal processing circuit as peripheral circuits. The CMOS image sensor is significantly useful in a personal digital assistant (PDA), such as a mobile phone, since it is capable of operating with a minimum power consumption.

FIGS. 1 and 2 show a structure of a camera lens module 1 used in a conventional mobile phone. As shown the camera lens module 1 comprises an image sensor 3 provided on a printed circuit board 2 and a lens holder 4 fitted with an infrared filter 5 (IR filter) facing the image sensor 3. The lens holder 4 is formed at an upper portion of the lens holder 4 with a lens assembling portion 4a having a thread inside thereof, into which a lens barrel 8 sequentially combined with first and second lenses 6 and 7 is fastened. The lens barrel 8 is formed at the top thereof with a lens cap 9 for the purpose of protecting the lenses. A spacer for maintaining a gap between the lenses 6 and 7 is provided between the first and second lenses 6 and 7.

For an adjustment of focal lengths between the image sensor 3 and respective lenses 6 and 7, the lens barrel 8 is adapted to adjust the focal length by rotating to fasten the screw between an external thread 8a formed on the external surface of the lens barrel 8 and an internal thread 8b formed on the internal surface of the lens assembling portion 4a. Here, the lens barrel 8 is fixed in place by bonding with an epoxy resin. That is, when the focal lengths between the image sensor 3 and the lenses 6 and 7 are adjusted using the screw fastening of the lens barrel 8, the epoxy resin is used to bond the lens barrel.

In the conventional camera lens module of the above configuration, however, since the focal length is fixed in place using the epoxy resin after adjusting the focal length between the image sensor and the first and second lenses, it is impossible to readjust the focal length between the lenses and the sensor when the lens is incorrectly adjusted.

SUMMARY OF THE INVENTION

Therefore, the present invention has been made in view of the above mentioned problems involved with the related art and provides additional advantages, by providing a lens holder apparatus of a camera lens module, which is integrally provided with the lens holder for readjusting a focal length after combining respective lenses in the camera module, thereby enabling the focal length of the camera lens to be readjusted.

One aspect of the present invention to provide a lens holder apparatus of a camera lens module, which is integrally provided with the lens holder and capable of readjusting the focal length after combining respective lenses in the camera module, thus simplifying the conventional lens barrel and lens cap design.

Another aspect of the present invention is to provide a lens holder apparatus of a camera lens module comprising a printed circuit board, an image sensor provided on the printed circuit board, first and second lenses, and a spacer. The lens holder apparatus further includes: a lens holder integrally defined with a space therein so that the first lens, the second lens, and the spacer can be sequentially combined in the lens holder, and adapted to allow the focal length between the sensor and respective lenses to be selectively adjusted after combining the first lens, the second lens, and the spacer; and a stopper detachably provided at a lower portion of the space of the lens holder, such that when fixing the first lens, the second lens, and the spacer in the lens holder, the stopper is combined with the lower portion thereof so that when readjusting the focal length between the sensor and respective lenses, the stopper can be separated from the lower portion and then recombined therewith after the readjustment of the focal length.

DETAILED DESCRIPTION

Figure 1:
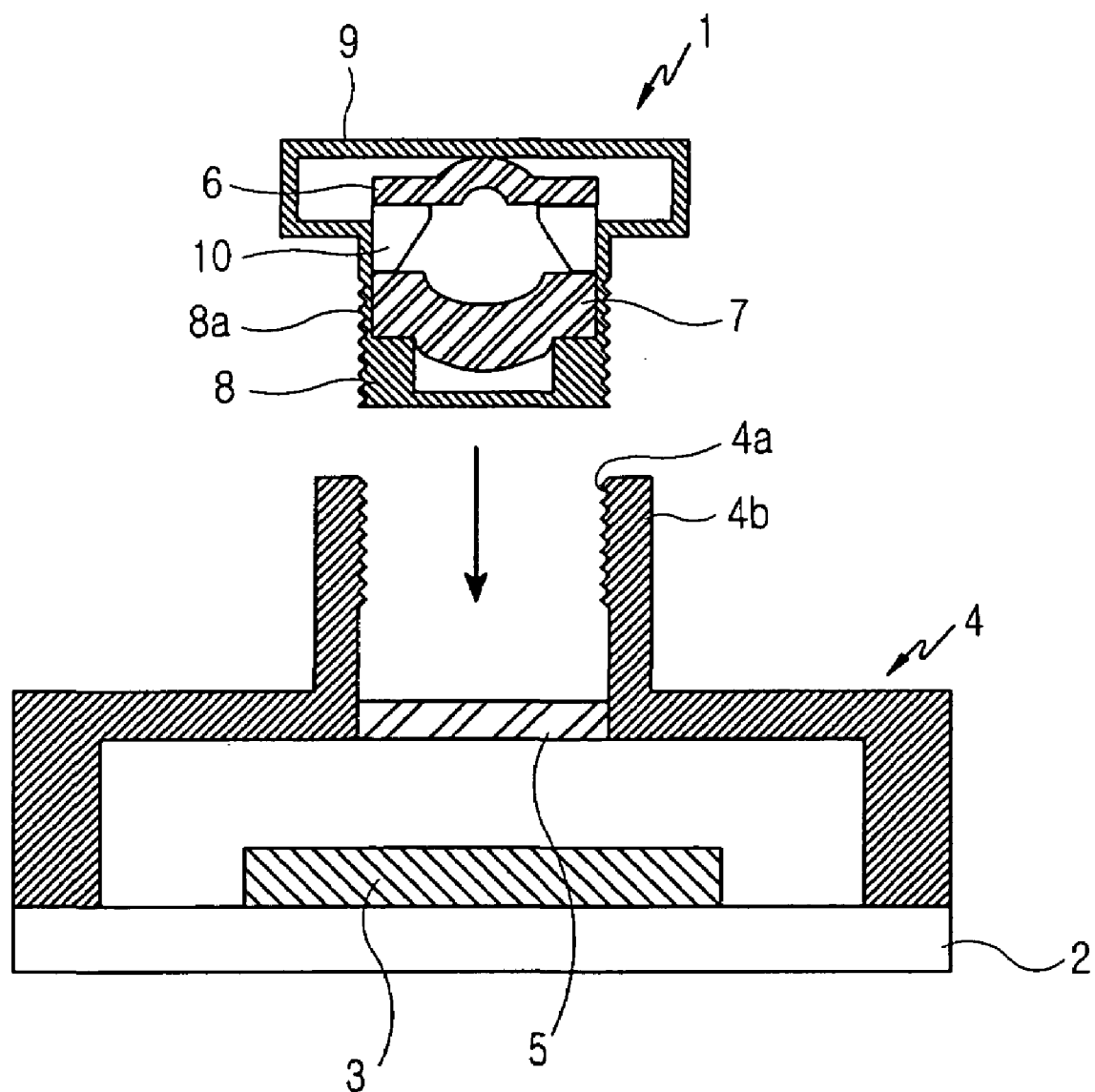
FIG. 1 is a sectional side elevation illustrating a conventional camera lens module and a lens holder apparatus in a separated state.
Figure 2:
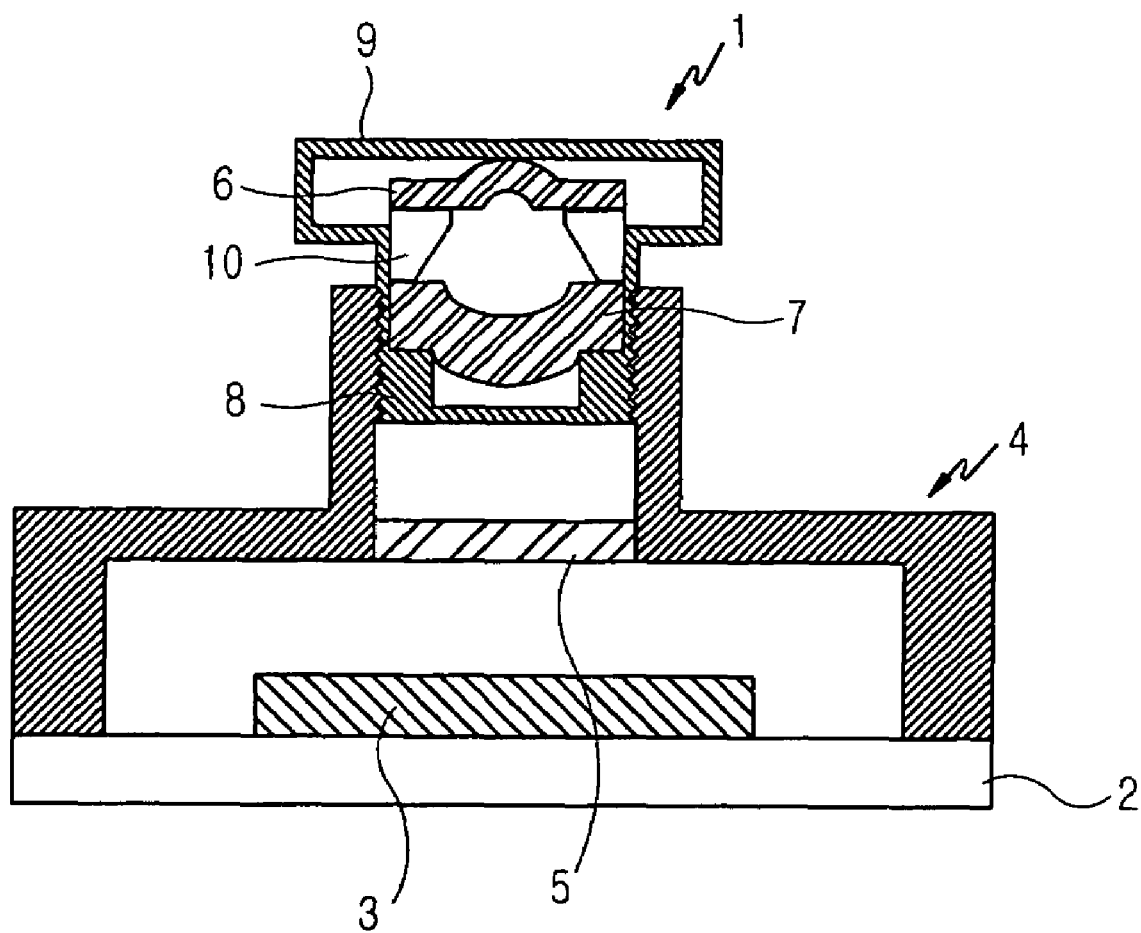
FIG. 2 is a sectional side elevation illustrating the conventional camera lens module and the lens holder in a combined state.
Figure 3:
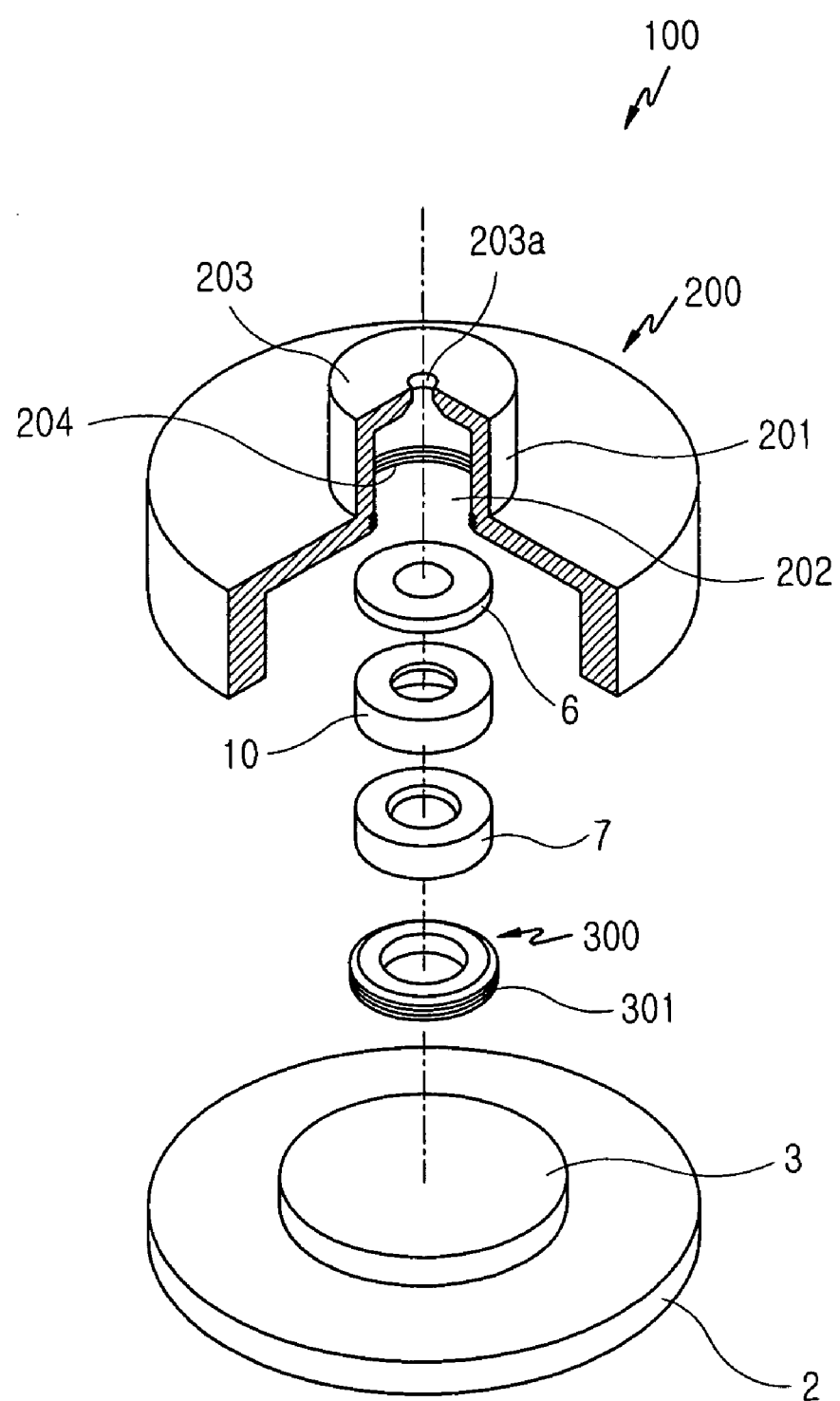
FIG. 3 illustrates the configuration of a lens holder apparatus of a camera lens module according to an embodiment of the present invention.

Referring to FIG. 3, a lens holder apparatus 100 of a camera lens module according to the present invention includes a lens holder 200 and a stopper 300.

The lens holder 200 having a space 202 therein so that first and second lenses 6 and 7 and a spacer 10 can be sequentially combined within the lens holder 200. The lens holder 200 is adapted to allow the focal lengths between a sensor 3 and respective lenses 6 and 7 to be adjusted after assembling the first lens 6, the second lens 7, and the sensor 3 together within the space 202.

The stopper 300 is detachably provided at a lower portion of the space 202 of the lens holder 200, such that when assembling the first and second lenses 6 and 7, and the spacer 10 together, the stopper 300 can be combined with the lower portion thereof such that when readjusting the focal lengths between the sensor 3 and respective lenses 6 and 7, the stopper 300 can be loose from the lower portion and then recombined therewith after the readjustment of the focal length.

Further, the lens holder 200 is formed at the center of an upper end thereof with a lens housing 201 such that the space 202 for combining the first lens 6, the second lens 7, and the spacer 10 therein can be provided.

The lens housing 201 has an inner wall formed of a holder side tooth 204 to be engaged with a stopper side tooth 301 formed on the stopper 300.

The lens holder 200 is provided at the upper end thereof with a lens protector 203 for protecting the surface of the first lens 6.

Further, the lens protector 203 is formed at the center thereof with a lens hole 203a such that an image of an object outside the camera can be captured through respective lenses 6 and 7.

The stopper 300 is formed with the stopper side tooth 301 around the outer periphery of the stopper 300 so that the stopper side tooth 301 can be engaged with the holder side tooth 204 formed on the lens holder 201 to be fixed. The stopper 300 has a ring shape and formed of an elastic rubber material such that the stopper 300 can be easily combined with the lens housing 201.

Figure 4:
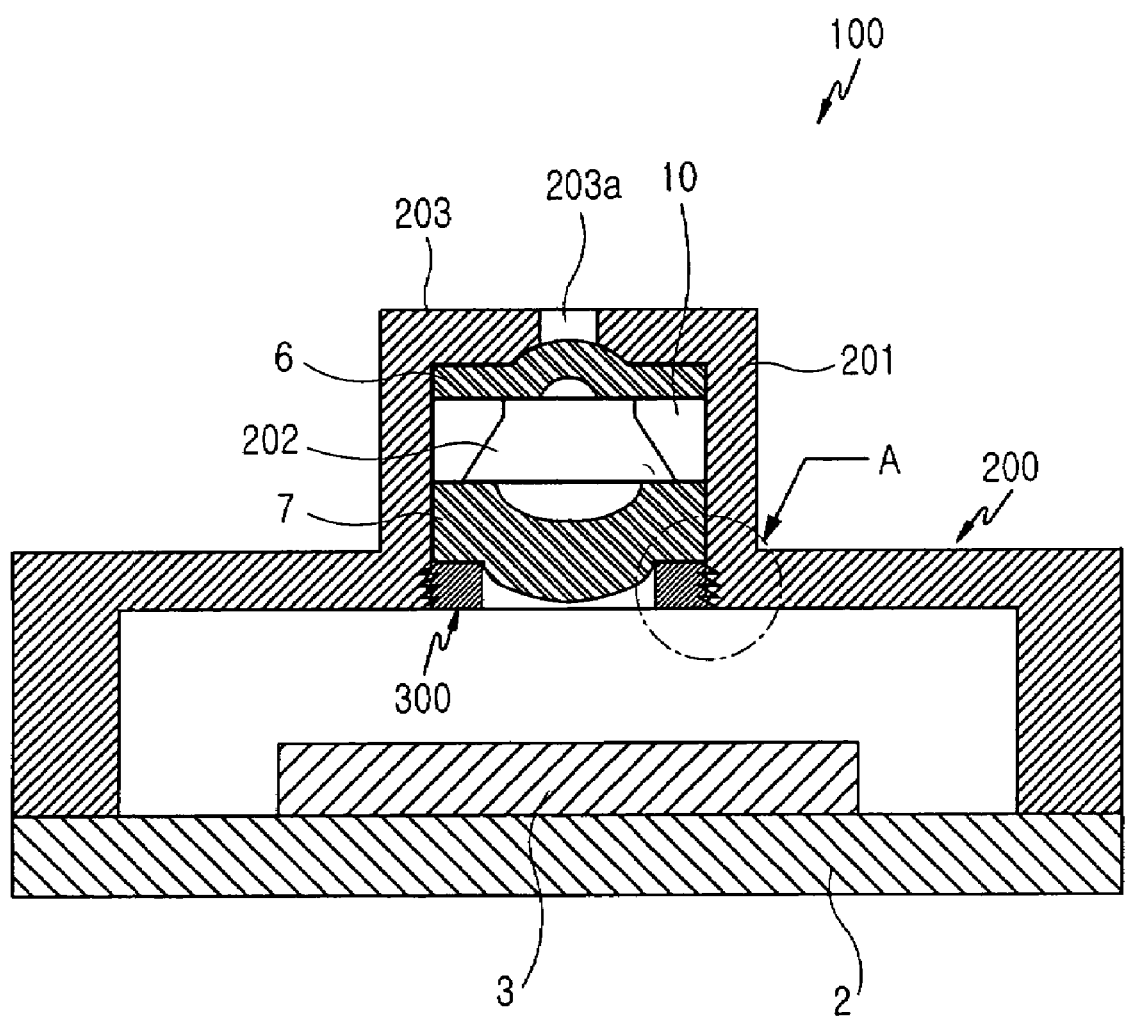
FIG. 4 is a sectional side elevation illustrating the camera lens module combined with the lens holder according to the embodiment of the present invention.
Figure 5:
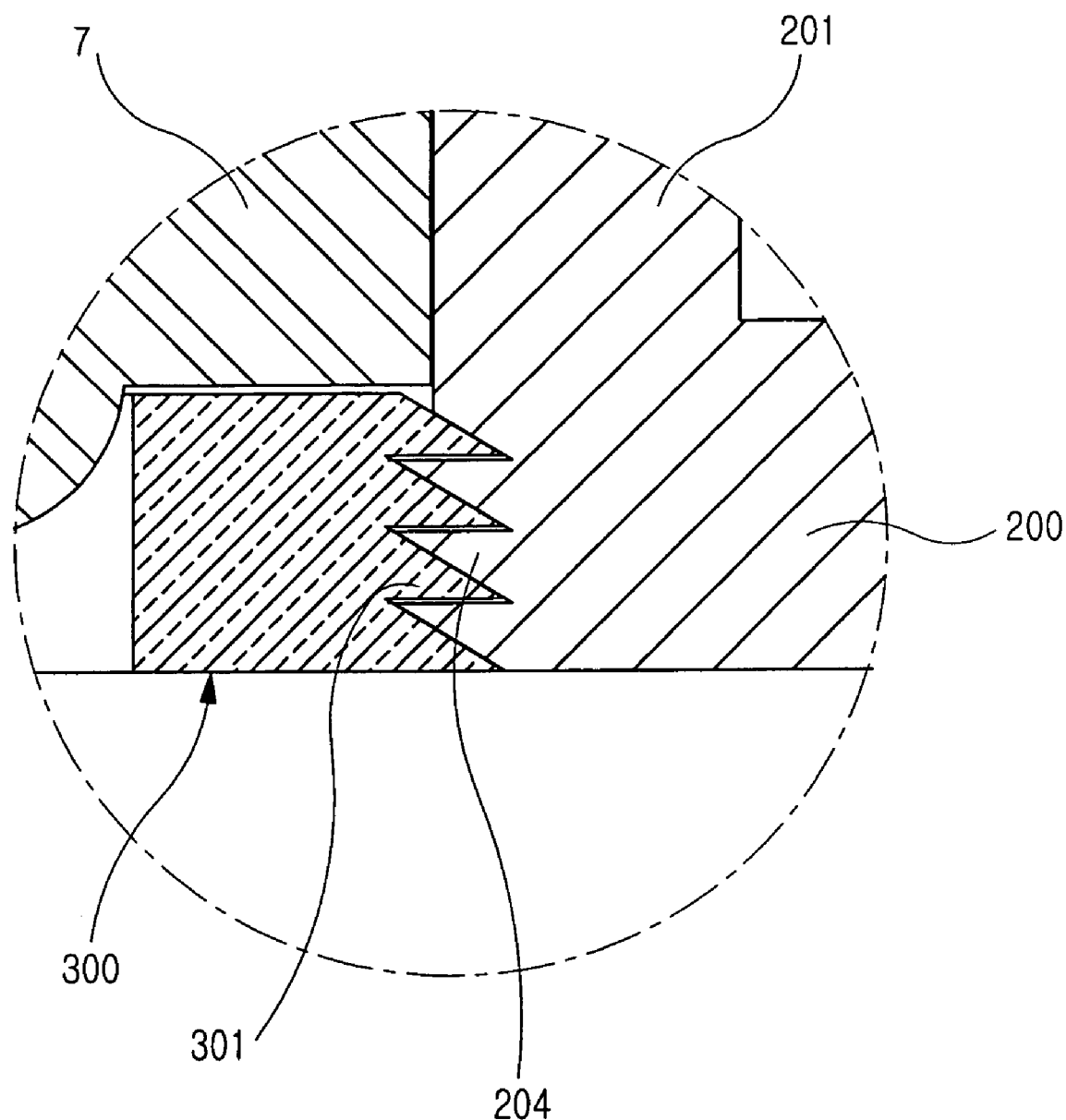
FIG. 5 is an enlarged sectional side elevation view of a portion in circle A of FIG. 4.

Now, operation of the lens holder apparatus of the camera lens module having the above configuration according to a preferred embodiment of the present invention will now be described in detail with reference to FIGS. 3 to 5.

The lens holder 200 is integrally formed at the center of the upper end thereof with the lens housing 201 for defining the space 202, in which the first lens 6, the second lens 7, and the spacer 10 are sequentially assembled within the lens holder 200. Thus, after the first lens 6 is inserted into the lens housing 201, the spacer 10 is combined therewith. At this state, the second lens 7 is inserted into the lens housing 201 to engage with the lens holder 200. Here, the spacer 10 allows a predetermined space between the first and second lenses 6 and 7 to be maintained.

After the first lens 6, the second lens 7, and the spacer 10 are sequentially combined within the lens housing 201, a focal length between the image sensor 3 on the printed circuit board and respective lenses 6 and 7 is adjusted.

With the spacer 10 and the first and second lenses 6 and 7 fixed to the lower portion of the lens housing 210, the stopper 300 provided for readjusting the focal length between respective lenses 6 and 7 and the sensor 3 is fixed to the lower portion of the lens housing 201.

The stopper 300 is formed with a stopper side tooth 301 around the outer periphery thereof such that the stopper side tooth 301 can be engaged with the holder side tooth 204 formed on the lens holder 201 to be fixed thereto. Thus, when the stopper 300 is combined with the lens housing 201 by press fitting, the stopper side tooth 301 is engaged with the holder side tooth 204 to be fixed thereto.

The stopper 300 has a ring shape and is formed of elastic rubber material such that the stopper 300 can be press-fitted into the holder side tooth 204. In this state, if the user wants to readjust the focal length between the sensor 3 and respective lenses 6 and 7, the stopper 300 fixed to the lens housing 201 can be pulled with an external force, thereby separating the stopper side tooth 301 and the holder side tooth 204 from each other.

Then, after adjusting the focal length between the sensor 3 and respective lenses 6 and 7, the stopper 300 can be press-fitted back into the lens housing 201 to hold to the lens housing 201 in place.

The lens housing 201 is provided at the upper end thereof with the lens protector 203 for protecting the surface of the first lens 6.

Finally, the lens protector 203 is formed at the center thereof with the lens hole 203a such that an image of an object outside the camera can be taken through respective lenses 6 and 7.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. An adjustable lens holder apparatus comprising:
   a printed circuit board;
   an image sensor provided on the printed circuit board;
   a plurality of lenses;
   a spacer for allowing a predetermined space between the lenses;
   a stopper;
   a lens holder for housing an assembly of the lenses, the spacer, and said stopper between said plurality of lenses and said image sensor,
   wherein said stopper is formed with a stopper side tooth around an outer periphery of the stopper such that the stopper side tooth can be detachably engaged with a holder side tooth formed on said lens holder; and
   wherein said stopper and said lens holder are configured for relative translation, between said stopper and said holder, to selectively adjust a focal length between the image sensor and respective lenses.

2. A lens holder apparatus comprising:
   a printed circuit board;
   an image sensor provided on the printed circuit board;
   a plurality of lenses;
   a spacer for allowing a predetermined space between the lenses;
   a lens holder for housing an assembly of the lenses and the spacer for allowing a focal length between the image sensor and respective lenses to be selectively adjusted; and
   a stopper detachably provided at a lower portion of the lens holder in contact with the assembly, such that the stopper can be detachably separated from the lower during the adjustment of the focal length.

3. The lens holder apparatus as set forth in claim 2, wherein the lens holder has an inner wall formed of a holder side tooth to be engaged with a stopper side tooth formed on the stopper.

4. The lens holder apparatus as set forth in claim 1, wherein the lens holder is further provided at an upper end thereof with a lens protector for protecting a surface of the lens.

5. The lens holder apparatus as set forth in claim 4, wherein the lens protector is formed at a center thereof with a lens hole such that an image of an object outside the camera can be captured through respective lenses.

6. The lens holder apparatus as set forth in claim 1, wherein the stopper has a ring shape.

7. The lens holder apparatus as set forth in claim 1, wherein the stopper is formed of an elastic rubber material.

8. A method for providing a lens holder comprising the steps of: providing a lens housing containing an assembly of a plurality of lenses and a spacer therebetween, the lens hosing including a tooth inside thereof, providing an image sensor in aligned with the assembly on a printed circuit board; providing a stopper having a tooth around the outer periphery thereof to engage, via press fitting, with the inside of the tooth of the lens housing.

9. The method as set forth in claim 8, providing a lens protector to the upper end of the lens housing.

10. The method as set forth in claim 9, providing an opening on the center of the lens protector in aligned with the lenses to capture an image.

11. The method as set forth in claim 8, wherein the stopper has a ring shape and is formed of an elastic rubber material such that the stopper can be press-fitted into inside the tooth of the lens housing.

12. The method as set forth in claim 8, wherein a focal length between the image sensor on the printed circuit board and respective lenses is selectively adjusted manually by a user.

13. The apparatus of claim 1, wherein said stopper and said lens holder are further configured for mutual engagement during the selective adjustment.

14. An adjustable lens holder comprising:
  a lens housing containing an assembly of a plurality of lenses and an intervening lens spacer, the lens housing including an inner tooth;
  an image sensor aligned with the assembly so as to receive light that passes through the plural lenses; and
  a stopper having an outer periphery, and a tooth around said periphery to engage, via press fitting, with an inside of said inner tooth.

15. The adjustable lens holder of claim 14, wherein said image sensor is aligned with said assembly on a printed circuit board, said lens housing having an end on the printed circuit board, and an opposite end at which lens protector resides.

* * * * *